US007383335B2

(12) United States Patent
Green et al.

(10) Patent No.: US 7,383,335 B2
(45) Date of Patent: Jun. 3, 2008

(54) METHOD AND APPARATUS FOR SECURING A PRINT JOB

(75) Inventors: Brett A. Green, Meridian, ID (US); Curtis Reese, Boise, ID (US); John R. Hatten, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 888 days.

(21) Appl. No.: 10/449,787

(22) Filed: May 29, 2003

(65) Prior Publication Data
US 2004/0243669 A1   Dec. 2, 2004

(51) Int. Cl.
*G06F 15/173* (2006.01)
(52) U.S. Cl. ............... 709/225; 709/203; 709/226; 358/1.2; 358/1.13
(58) Field of Classification Search ................. 709/203, 709/206, 223, 225, 226; 358/1.1, 1.2, 1.13; 726/2
See application file for complete search history.

(56) References Cited

U.S. PATENT DOCUMENTS

| | | | |
|---|---|---|---|
| 5,923,013 A * | 7/1999 | Suzuki et al. ............... 358/1.1 |
| 6,181,436 B1 * | 1/2001 | Kurachi ..................... 358/1.2 |
| 6,185,684 B1 * | 2/2001 | Pravetz et al. .............. 713/182 |
| 6,202,092 B1 * | 3/2001 | Takimoto ................... 709/225 |
| 6,202,096 B1 | 3/2001 | Williams et al. |
| 6,393,441 B1 | 5/2002 | Kanerva et al. |
| 6,437,869 B1 | 8/2002 | Matoba |
| 6,463,435 B1 * | 10/2002 | Bergmans ................... 358/1.13 |
| 6,529,948 B1 | 3/2003 | Bowman-Amuah |
| 6,539,396 B1 | 3/2003 | Bowman-Amuah |
| 6,550,057 B1 | 4/2003 | Bowman-Amuah |
| 6,571,282 B1 | 5/2003 | Bowman-Amuah |
| 6,600,569 B1 * | 7/2003 | Osada et al. ................ 358/1.1 |
| 6,892,201 B2 * | 5/2005 | Brown et al. ................. 707/9 |
| 6,971,007 B1 * | 11/2005 | Currans ..................... 358/1.13 |
| 7,103,182 B2 * | 9/2006 | Parry ........................ 709/206 |
| 7,301,663 B2 * | 11/2007 | Ferlitsch .................... 358/1.14 |
| 7,321,437 B2 * | 1/2008 | Parry ........................ 709/225 |

FOREIGN PATENT DOCUMENTS

JP         2003025692 A      1/2003

* cited by examiner

*Primary Examiner*—Ario Etienne
*Assistant Examiner*—Ramy M Osman

(57) ABSTRACT

A method of printing a print job includes separating a print job into subsections, and identifying a subsection access level for the subsections of the print job. A requesting party is also provided with an access level that is determined. In one embodiment, the requesting party's access level is placed in a print job by a print driver program of a requesting party. The subsection access level and the requesting party access level are compared, and the subsections of the print job that have a subsection access level meeting the requesting party access level are printed. A system for secure printing of a print job includes a processor, a storage device, a printer, and software operable on the processor to identify subsections of a print job, and identify a subsection access level for the subsections of the print job. The system includes media that includes instructions operable on a processor to identify subsections of a print job, and identify a subsection access level for the subsections of the print job.

12 Claims, 5 Drawing Sheets

METHOD AND APPARATUS FOR SECURING A PRINT JOB

FIELD OF THE INVENTION

The present invention relates to printers, and in particular to a method and apparatus for securing a print job.

BACKGROUND OF THE INVENTION

It is well known that the generation or design of a document often includes the use of a computer-based text editing application, such as Microsoft Word, or a graphics software package, such as Microsoft. PowerPoint. After a user generates a document, it can be printed. In the Microsoft Windows printing paradigm, the application works in conjunction with the Windows Operating System's printing subsystem, which generally includes a Graphical Device Interface and printer driver software, to format the document into a print-ready data file that that can be received and interpreted by a printer. These print-ready data files are generally comprised of printer instructions that configure the device for printing the job and direct the device as to how to mark the page. The printer instructions are represented in a specific format, referred to in the printing industry as Page Description Language (PDL). There are many PDLs in existence today, including several that were designed by Hewlett-Packard, such as HP PCL5, HP PCL6 and HPGL/2. In any case, print-ready files can be sent directly to a printer to be printed immediately, or stored for printing at a later time This process typically applies to all types of printers, including laser printers, ink jet printers, impact printers and thermal printers. In addition, this process also typically applies in general to other hardcopy devices, such as plotters or facsimile machines. Conveniently, herein, the term "printer" covers all such different types of printers, and other hardcopy or document rendering apparatus and devices.

The advent of distributed computer systems made it possible for a single network printer to be used by multiple users. Typically, network printers are attached to computing platforms operating as print servers within distributed systems. Alternatively, some printers, when provided with appropriate interfaces, can be arranged to connect directly to the network of a distributed system.

Network printers, whether connected directly, or via a print server, to a network, can provide a substantial cost advantage, since each user need not have his own printer connected to, or located near to, his own computer system.

The ability to access network printers, and other devices, from a local computer, is readily supported by operating systems such as UNIX, and most of Microsoft's Windows Operating Systems, including Windows ME, Windows 2000, Windows XP, etc. Each of these operating systems are designed to be configured to manage distributed operations such as remote printing or data management.

One problem associated with printing documents on remote network printers is that any person near to the printer can remove or read printed documents containing sensitive information not intended for the person to see. One solution is for users who need to print sensitive documents to arrange for a trusted person to stand by the printer as the document is printing and collect the document as soon as it has printed. This is a very inconvenient solution.

Another solution is to print sensitive documents only on a local printer. The latter case, however, undermines any cost advantages gained in having a centrally located, network printer, especially if many users need to print sensitive documents.

Still another problem associated with remote printing of sensitive documents is that someone can intercept or monitor the transfer of data between the local computer and network printer. For example, anyone with access to a print spooler or print server receiving the document for printing could access the document. When a print job is created, a person on the network can capture the stream of data making up the print job and print it on any device. As a result, content sensitive data can be easily accessed by anyone on a network. The result can be a serious breach of security. Some may contend that this is not a problem since a print format may not be in a text bound language therefore preventing perusal by the naked eye. However, such a binary data stream can be easily converted to text readable output, with the right software tools, resulting in the same security threat discussed previously.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION OF THE INVENTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

The functions described herein are implemented in software in one embodiment, where the software comprises computer executable instructions stored on computer readable media such as memory or other type of storage devices. The term "computer readable media" is also used to represent carrier waves on which the software is transmitted. Further, such functions correspond to modules, which are software, hardware, firmware of any combination thereof. Multiple functions are performed in one or more modules as desired, and the embodiments described are merely examples.

Figure 1:
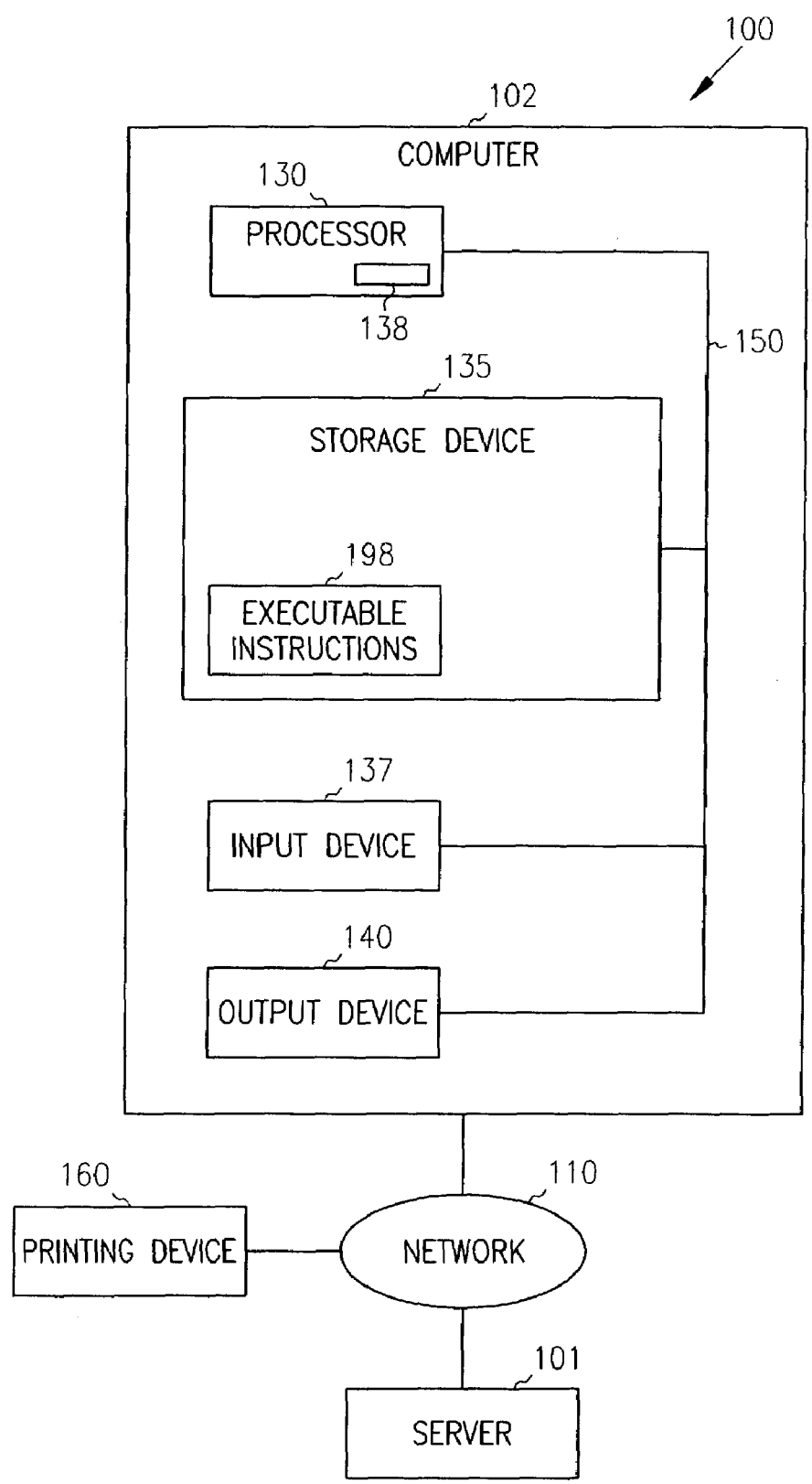
FIG. 1 is a schematic diagram of a computer system according to an embodiment of this invention.

FIG. 1 is a schematic diagram of an electronic device 100. The electronic device 100 includes a computer system 102 according to an embodiment of this invention. The computer system 102 includes a processor 130 and a storage device 135. The storage device 135 includes executable instructions 198. The executable instructions 198 are stored within the storage device 135. The electronic device 100 includes a network 110 and a server 101. The computer 100 is communicatively coupled to the network 110. The network 110 and the computer 102 are communicatively coupled to the server 101. A printer 160 is attached to the network 110. The printer can be associated with the computer 102 or can be associated with another computer or device attached to the network, as shown in FIG. 1.

The processor 130 represents a central processing unit of any type of architecture, such as CISC (Complex Instruction Set Computing), RISC (Reduced Instruction Set Computing), VLIW (Very Long Instruction Word), or hybrid architecture, although any appropriate processor may be used. The processor 130 executes instructions and includes that portion of the electronic device 100 that controls the operation of the entire electronic device. Although not depicted in FIG. 1, the processor 130 typically includes a control unit 138 that organizes data and program storage in memory and transfers data and other information between the various parts of the electronic device 100. The processor 130 receives input data from the input device 137 and the network 110, reads and stores code and data in the storage device 135, and presents data to an output device 140 and/or the network 110.

Although the electronic device 100 is shown to contain only a single processor 130 and a single bus 150, the present invention applies equally to electronic devices that may have multiple processors and multiple buses with some or all performing different functions in different ways.

The storage device 135 represents one or more mechanisms for storing data. For example, the storage device 135 may include read only memory (ROM), random access memory (RAM), magnetic disk storage media, optical storage media, flash memory devices, and/or other machine-readable media. In other embodiments, any appropriate type of storage device may be used. Although only one storage device 135 is shown, multiple storage devices and multiple types of storage devices may be present, and in various embodiments some or all of the product codes, the controller 138, and the products may be stored on the same or on different storage devices. Further, although the electronic device 100 is drawn to contain the storage device 135, it may be distributed across other electronic devices, for example on computers attached to the network 110.

The controller 138 includes instructions capable of being executed on the processor 130 to carry out the functions of the present invention. In another embodiment, some or all of the functions of the present invention are carried out via hardware in lieu of a processor-based system.

The input device 137 may be a keyboard, mouse or other pointing device, trackball, touchpad, touchscreen, keypad, microphone, voice recognition device, or any other appropriate mechanism for the user to input data to the electronic device 100. Although one input device 137 is shown, in another embodiment any number (including none) and type of input devices may be present.

The output device 140 is that part of the electronic device 100 that communicates output to the user. The output device 140 may be a cathode-ray tube (CRT) based video display well known in the art of computer hardware. But, in other embodiments the output device 140 may be replaced with a liquid crystal display (LCD) based or gas, plasma-based, flat-panel display. In another embodiment, the output device 140 may be a speaker. In still other embodiments, any appropriate output device may be used. Although one output device 140 is shown, in other embodiments, any number (including none) of output devices of different types or of the same type may be present. In one embodiment, the output device is part of the printer 160. In another embodiment, the output device is a separate, stand-alone device.

The bus 150 may represent one or more busses, e.g., PCI, ISA (Industry Standard Architecture), X-Bus, EISA (Extended Industry Standard Architecture), or any other appropriate bus and/or bridge (also called a bus controller).

The electronic device 100 may be implemented using any suitable hardware and/or software, such as a personal computer. Portable computers, laptop or notebook computers, PDAs (Personal Digital Assistants), pocket computers, telephones, pagers, appliances, and mainframe computers are examples of other possible configurations of the electronic device 100. The hardware and software depicted in FIG. 1 may vary for specific applications and may include more or fewer elements than those depicted. For example, other peripheral devices such as audio or chip programming devices, such as EPROM (Erasable Programmable Read-Only Memory) programming devices may be used in addition to or in place of the hardware already depicted.

The network 110 may be any suitable network and may support any appropriate protocol suitable for communication between the electronic device 100 and the printer 160 or other electronic devices. In an embodiment, the network 110 may support wireless communications. In another embodiment, the network 110 may support hard-wired communications, such as a telephone line or cable. In another embodiment, the network 110 may support the Ethernet IEEE (Institute of Electrical and Electronics Engineers) 802.3x specification. In another embodiment, the network 110 may be the Internet and may support IP (Internet Protocol). In another embodiment, the network 110 may be a local area network (LAN) or a wide area network (WAN). In another embodiment, the network 110 may be a hotspot service provider network. In another embodiment, the network 110 may be an intranet. In another embodiment, the network 110 may be a GPRS (General Packet Radio Service) network. In another embodiment, the network 110 may be any appropriate cellular data network or cell-based radio network technology. In another embodiment, the network 110 may be a wireless network. In still another embodiment, the network 110 may be any suitable network or combination of networks. Although one network 110 is shown, in other embodiments any number of networks (of the same or different types) may be present.

Aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

Figure 2:
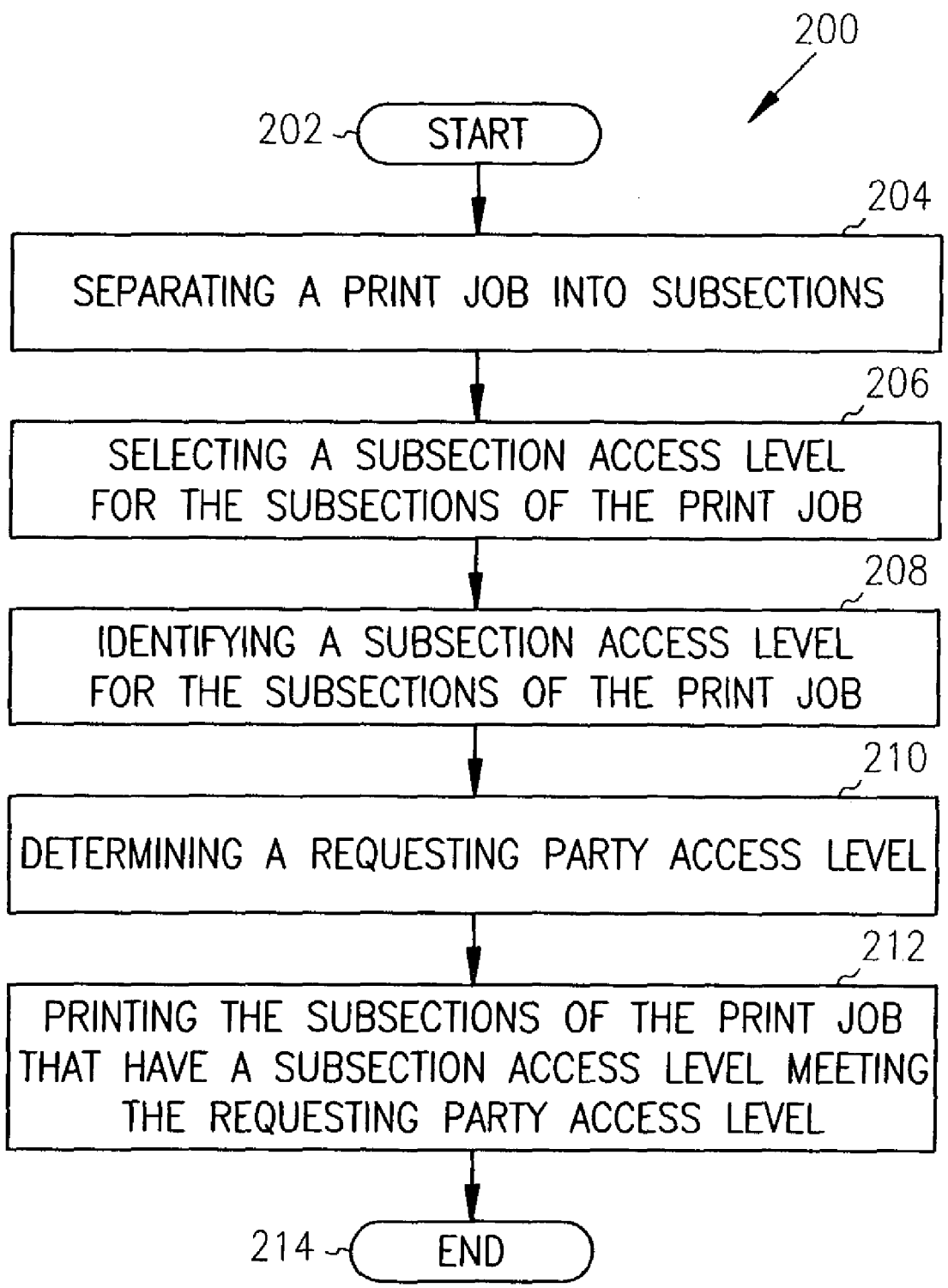
FIG. 2 is a flow chart including a method of controlling a printer according to an embodiment of this invention.

The invention relates to the control of a printer where a different person is requesting execution of a print job from the person that created the print job or document. FIG. 2 is a flowchart including a method of controlling a printer according to an embodiment of the invention. The method 200 includes starting the process or method, as depicted by reference numeral 202. The print job is separated into subsections, as depicted by reference numeral 204. Each of the subsections is provided with a subsection access level. The subsection access level is selected and associated with each of the subsections of the print job, as depicted by reference numeral 206. It should be noted that in an alternative embodiment a subsection access level can be set for certain subsections of the print job which are less than all of the subsections associated with the print job. In one embodiment, the subsections that do not carry an access level are given a default access level. In one embodiment, the default access level is the lowest access level or subsection for any subsection and, in another embodiment, the subsection access level default is set to the highest subsection access level for any subsections of the print job wherein a subsection access level is not designaled The subsection access level is then identified for each of the subsections of the print job, as depicted by reference numeral 208. A requesting party access level is then determined, as depicted by reference numeral 210. The subsection access level and the requesting party access level are then compared and the subsections of the print job that have a subsection access level meeting the requesting parry access level are then printed, as depicted by reference numeral 212. The method then ends, as depicted by reference numeral 214, for the particular execution of the print job for the particular printer 160.

It should be noted that different users may use the same computer to execute print jobs. If this is the case, then each user of the computer will have to be provided with some sort of security password so that the computer can identify the user as well as the access level associated with that user, In another embodiment, a requesting party may be using another electronic device such as a computer, on the network or connected to a network 110. The requesting party's device or computer is capable of printing print jobs at the printer 160 attached to the network 110 (shown in FIG. 1). In this particular embodiment, the requesting party's access level can be placed into a print job by the printer driver program of the computer electronic device used by the requesting party. Thus, the requesting party's access level is automatically input in the print job by the printer driver program. Of course, it should be noted that only certain or select computer professionals should be allowed to change the access levels set within the requesting party's printer driver.

Figure 3:
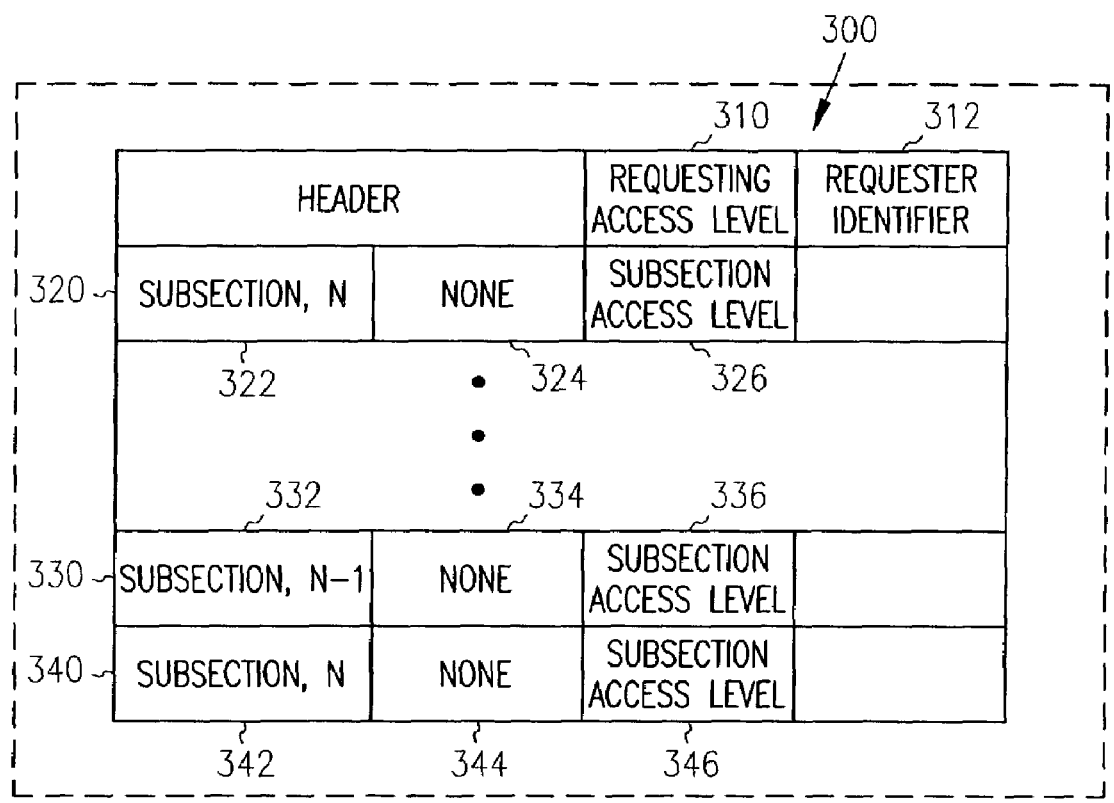
FIG. 3 is a representation of a data structure associated with an embodiment of the invention.

Providing subsection access levels for the subsections of the print job is initially done by the creator of the document. One way of providing the computer or printer 160 with the various subsection access levels associated with a print job is to provide a data structure within the print job that includes a header. FIG. 3 is a representation of the data structure 300 associated with art embodiment of the invention. The header would include a field that includes the requesting party's access level, shown by the reference numeral 310. In addition, the data structure would include a field that has an identifier for the requester, as depicted by reference numeral 312. The data structure would include a plurality of subsection entries, such as subsection entry 320, subsection entry 330 and subsection entry 340. Each of the subsection entries 320, 330, 340 includes several fields. For example, subsection entry 320 includes a subsection identifier 322, a specific name field 324 and a subsection access level designation, field 326. Similarly, entry 330 includes a field 332 for a subsection identifier, a field 334 for a specific name of the subsection and a subsection access level field 336. The entry 340 also includes a subsection identifier 342, a subsection name 344 and a subsection access level designator field 346. The subsection identifiers 322, 332, 342 include delimitators which determine the length of the subsection of a document. The name 324, 334, 344 associated with the subsection can be either a number or a word which identifies the subsection. The subsection access level 326, 336, 346 is set by the creator of the document. The creator of the document would essentially produce the document and delineate the subsections 322, 332, 342 and then set access levels 326, 336, 346 and names 324, 334, 344 for each of the particular subsections 322, 332, 342. The header or the data structure 300 shown would be a portion of the print job. The print job would also include specific commands and instructions on how to print the data that can be printed at the particular printer 160 attached to the network 110. The print job would contain many other details as to formatting of the print job, the location of the data to be printed, and other details.

Figure 4:
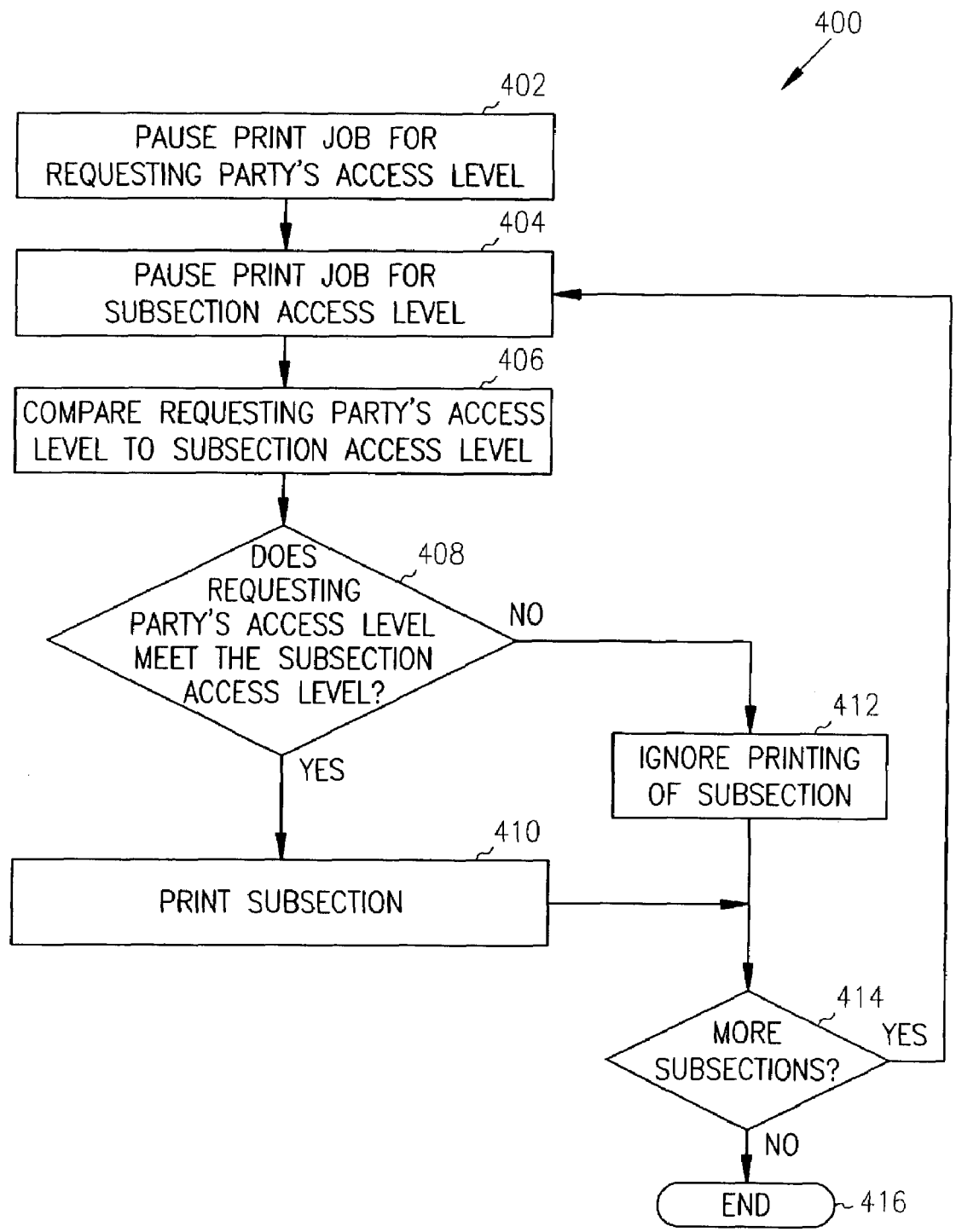
FIG. 4 is a flow chart including a method of parsing the header information to control a printer, according to an embodiment of this invention.

FIG. 4 is another flowchart showing the process that is used for printing, according to an embodiment of the invention. The process 400 includes parsing the print job for the requesting party's access level, as depicted by reference numeral 402. The print job is also parsed for the subsection access level, as depicted by reference numeral 404. The requesting party access level is compared to the subsection access level, as depicted by reference numeral 406. Next, a decision is made regarding whether or not the requesting party's access level meets the subsection access level, as depicted by reference numeral 408. If the requesting party's access level meets the subsection access level, the subsection is printed, as depicted by reference numeral 410. If the requesting party's access level fails to meet the subsection access level, the printing of that particular subsection is ignored, as depicted by reference numeral 412. Next, it is determined whether or not there are more subsections, as depicted by reference numeral 414. If there are more subsections, the process returns to parsing the print job for a subsection access level, as depicted by reference numeral 404, and is repeated until there are no more subsections. When there are no more subsections, the process ends, as depicted by reference numeral 416.

Simply put, a method of printing a print job includes separating a print job into subsections, and identifying a subsection access level for the subsections of the print job. A requesting party is also provided with an access level that is determined. In one embodiment, the requesting party's access level is placed in a print job by a print driver program of a computer or electronic device used by the requesting party. The subsection access level and the requesting party access level are compared. The method includes printing the subsections of the print job that have a subsection access level meeting the requesting party access level.

In one embodiment, identifying a subsection access level for the subsections of the print job further include providing the print job with a header. The header includes the subsections, and the subsection access level associated with the subsections. The creator of a document can set the subsection access level. The subsection access level is set in the document so that a print driver of a party creating the document sets the subsection access level in the print job.

A system for secure printing of a print job includes a processor, a storage device, a printer, and software operable on the processor to identify subsections of a print job, and identify a subsection access level for the subsections of the print job. The software is further operable on the processor to determine a requesting party access level, compare the requesting party access level to the subsection access level for the plurality of subsections, and print the subsections of the print job that have a subsection access level meeting the requesting party access level. In some embodiments, the software is further operable on the processor to select a subsection access level for the subsections of the print job. In still other embodiments, the software is further operable on the processor to select a subsection access level for the subsections of the print job by causing a print driver of a party creating the document to set the subsection access level in the print job. Determining a requesting party access level includes reading an access level of the requesting party in the print job. The requesting party access level is set in the print job by a print driver program of the requesting party.

Figure 5:
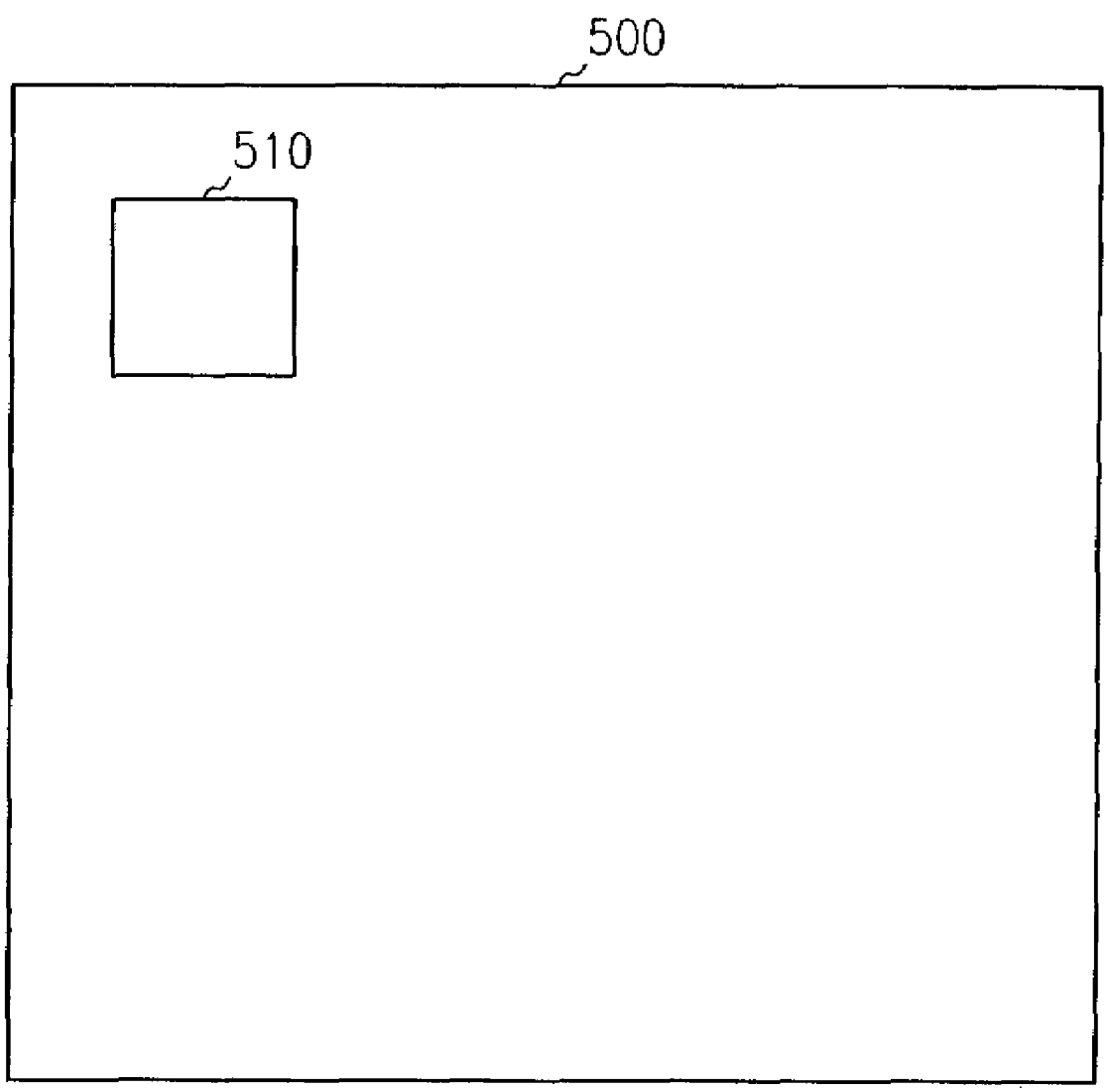
FIG. 5 is a block diagram of a computer readable medium that includes an instruction set thereon.

FIG. 5 is a block diagram of a computer readable medium 500 that includes an instruction set 510, thereon. The instruction set 510 can be any set of instructions including a computer program. The computer readable medium can be any computer-readable medium including a storage device or a signal-bearing medium. A computer-usable storage medium having a computer program thereon causes a suitably configured electronic device 100 or information-handling system to print subsections of a print job by performing the following steps when such program is executed on the system: identifying subsections of a print job, identifying a subsection access level for the subsections of the print job, determining a requesting parry access level, and printing the subsections of the print job that have a subsection access level meeting the requesting party access level. The computer program further includes instructions for causing the system, when such program is executed on the system, to ignore the subsections of the print job that have a subsection access level above the requesting party access level.

One embodiment of the invention includes a signal-bearing medium encoded with a data structure accessed by a program that is to be executed by a processor. In this embodiment, the data structure includes a plurality of entries, each entry comprising: an identifier that identifies a subsection of a print job, and a subsection access level associated with the subsection of the print job.

Such signal-bearing media, when carrying machine-readable instructions that direct the functions of the present invention, represent embodiments of the present invention.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

The device shown and described above is shown as one computer controlling one printer. It should be noted that in further embodiments, the devices may be separate, stand alone devices that communicate directly with each other through a direct wired or wireless cable, or via a network. The processor may be located in one of the devices with the capability to control still other devices over a network.

In the previous description, numerous specific details were set forth to provide a thorough understanding of the invention. However, it is understood that the invention may be practiced without these specific details. In other instances, well-known circuits, structures, and techniques have not been shown in detail in order not to obscure the invention.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of Embodiments of the Invention, with each claim standing on its own as a separate preferred embodiment.

The invention claimed is:

1. A method for secure printing of a print job, comprising:
    separating the print job into subsections;
    associating a subsection access level with each of the subsections of the print job;
    determining an access level of a party requesting printing of the print job, including setting the access level of the requesting party in the print job by a print driver program of the requesting party;
    identifying the subsection access level of each of the subsections of the print job; and
    printing a respective subsection of the print job only if the access level of the party requesting printing of the print job meets the subsection access level of the respective subsection.

2. The method of claim 1 wherein associating the subsection access level with each of the subsections of the print job includes causing a print driver of a party creating a document of the print job to set the subsection access level in the print job.

3. The method of claim 1 wherein associating the subsection access level with each of the subsections of the print job comprises providing the print job with a header, the header including the subsections and the subsection access level associated with the subsections.

4. The method of claim 1 wherein associating the subsection access level with each of the subsections of the print job comprises setting of the subsection access level of each of the subsections by a party creating a document of the print job.

5. The method of claim 1 wherein separating the print job into subsections comprises separating the print job into subsections by a party creating a document of the print job.

6. A system for secure printing of a print job, comprising:
   a processor configured to identify a plurality of subsections of the print job, identify a subsection access level of each of the subsections of the print job, determine an access level of a party requesting printing of the print job, and compare the access level of the party requesting printing of the print job to the subsection access level of each of the subsections; and
   a printer configured to print a respective subsection of the print job only if the access level of the party requesting printing of the print job meets the subsection access level of the respective subsection,
   wherein the processor is configured to determine the access level of the requesting party by reading an access level of the requesting party from the print job, and wherein the access level of the requesting party is set in the print job by a print driver program of the requesting party.

7. The system of claim 6 wherein the processor is configured to select the subsection access level for each of the subsections of the print job.

8. The system of claim 6 wherein the processor is configured to select the subsection access level for each of the subsections of the print job by causing a print driver of a party creating a document of the print job to set the subsection access level in the print job.

9. The system of claim 6 wherein the print job is separated into subsections by a party creating a document of the print job.

10. The system of claim 6 wherein the subsection access level of each of the subsections of the print job is set by a party creating a document of the print job.

11. A computer-usable storage medium having a computer program thereon for causing a suitably configured information-handling system to print subsections of a print job by performing the following steps when such program is executed on the system:
    identifying subsections of a print job;
    identifying a subsection access level of each of the subsections of the print job;
    determining an access level of a party requesting printing of the print job, including setting the access level of the requesting party in the print job by a print driver program of the requesting party;
    comparing the access level of the party requesting printing of the print job to the subsection access level of each of the subsections; and
    printing a respective subsection of the print job only if the access level of the party requesting printing of the print job meets the subsection access level of the respective subsection.

12. The storage medium of claim 11, wherein the computer program further comprises programming for causing the system, when such program is executed on the system, to perform the following additional step of ignoring the subsections of the print job that have a subsection access level above the requesting party access level.

* * * * *

UNITED STATES PATENT AND TRADEMARK OFFICE
CERTIFICATE OF CORRECTION

| | |
|---|---|
| PATENT NO. | : 7,383,335 B2 |
| APPLICATION NO. | : 10/449787 |
| DATED | : June 3, 2008 |
| INVENTOR(S) | : Brett A. Green et al. |

It is certified that error appears in the above-identified patent and that said Letters Patent is hereby corrected as shown below:

In column 5, line 28, delete "designaled" and insert -- designated. --, therefor.

In column 5, line 35, delete "parry" and insert -- party --, therefor.

In column 5, line 64, delete "art" and insert -- an --, therefor.

In column 7, line 37, delete "parry" and insert -- party --, therefor.

Signed and Sealed this

Eleventh Day of August, 2009

David J. Kappos
*Director of the United States Patent and Trademark Office*